March 28, 1933.  H. R. WOLF  1,903,077
METHOD OF UNITING DISSIMILAR METALS
Filed Dec. 22, 1930

Inventor
Harry R. Wolf
By Blackmore, Spencer & Hulse
Attorneys

Patented Mar. 28, 1933

1,903,077

UNITED STATES PATENT OFFICE

HARRY R. WOLF, OF DETROIT, MICHIGAN, ASSIGNOR TO GENERAL MOTORS RESEARCH CORPORATION, OF DETROIT, MICHIGAN, A CORPORATION OF DELAWARE

METHOD OF UNITING DISSIMILAR METALS

Application filed December 22, 1930. Serial No. 503,994.

This invention relates to a method of securing two metals together and has particular reference to cutting tools and to the securing of the cutting member to the tool.

Hard cutting materials composed principally of tungsten carbide are attached to tool shanks by brazing with brass or copper in a hydrogen furnace. Some new metallic carbide cutting materials containing tantalum carbide, which according to preliminary tests appear to be superior to tungsten carbide, are not wetted by copper and cannot be brazed or bonded in the conventional manner. In order to bond these newer materials a powdered cast iron cementing material is recommended. The bond or weld is too rigid and in cooling from the welding temperature the carbide cutting tip develops cracks which greatly decrease the life of the tool.

In order to wet the carbide cutting material with copper in the brazing operation, it is proposed to deposit copper electrolytically on the cutting material and then braze with brass or copper in a hydrogen or reducing atmosphere. The electrolytically deposited copper may be only a thin deposit and a thin sheet of copper interposed before the brazing operation. Or the deposited copper may be in sufficient quantity to make unnecessary the added sheet of copper. The invention is not to be limited to the use of copper as many other electrolytically depositable metals such as nickel, etc., will do as well. Also other metals or alloys may be used instead of copper as the thin interposed sheet.

A cutting substance commercially known as Ramet (tantalum carbide) has appeared on the market and has superior qualities as a cutting material. It has been found very difficult or impossible to secure Ramet to the cutting tool by known methods. By electrolytically depositing copper on the Ramet cutting material and placing the coated material on the tool holder which has previously been thoroughly cleaned, it has been found that the Ramet will rigidly adhere when the tool and Ramet are heated in a hydrogen furnace. The electrolytically deposited copper may be only a thin film insufficient in itself or a thicker layer ample for the brazing operation. Where a thin film is used, a sheet of copper is interposed before the brazing operation.

The interposition of a thin sheet of copper between an uncoated tantalum carbide cutting member and the tool shank has been tried but the results were not satisfactory. The reason is thought to be due to the fact that there is a superficial layer of oxides on the carbide cutting member which is difficult to reduce by hydrogen and/or hydrogen combines with the carbide cutting member and prevents the formation of a satisfactory bond.

The invention is generally applicable to all instances where it is desired to secure two metals together and is not to be limited to the securing of a cutting member to its tool, this illustration being given solely by way of example.

Figure 1:
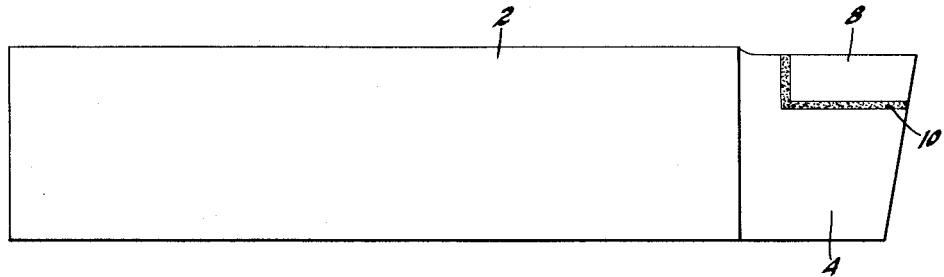
Figure 1 is a side elevation of the cutting tool with a cutting member secured thereto, illustrating one application of the invention.
Figure 2:
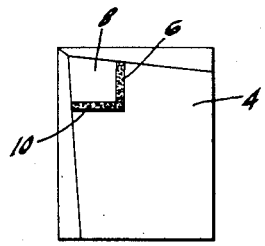
Figure 2 is an end view of Figure 1.

Referring to the drawing, numeral 2 indicates the cutting tool as a whole. The tool has the reduced end portion 4 which is provided with a rabbet or recessed portion 6. In the rabbet there is received the cutting member 8 such as a piece of Ramet. The numeral 10 indicates the bond of electrolytically depositable metal such as copper, nickel, etc., after the tool has been heated in the hydrogen furnace.

In securing the cutting member 8 in the recess 6 the recess is first thoroughly cleaned to remove any foreign matter. On the cutting material or member 10 there is then electrolytically deposited a coating such as copper, nickel, etc. The coated member is now positioned in the recess 6 and the tool then placed in a hydrogen furnace and heated. In the heating the copper or nickel, etc., is melted. A firm bond results and the cutting member is thoroughly secured in a recess 6.

If desired both of the metals to be joined may have an electrolytic deposit of copper, nickel, etc. or in addition to these deposits a thin sheet of copper, nickel, silver solder, alloy, etc. may be interposed before the metals to be joined are placed in the reducing furnace to melt the bonding metals.

I claim:

1. The method of securing a tantalum carbide cutting member to its tool comprising in cleaning the tool at the place of receiving the member, cleaning and then coating the member with copper, placing the copper coated member at the cleaned place, then heating the tool and member in a hydrogen gas until the copper is melted.

2. The method of securing tantalum carbide to a metal consisting in cleaning one of them, electrolytically depositing copper on the other, placing the two together, and then heating in a reducing atmosphere until the copper is melted.

3. The method of securing tantalum carbide to a metal consisting in cleaning both of them at the places where they are to be secured together, electrolytically depositing a bonding metal on both, placing the two together, and then heating in a reducing atmosphere until the electrolytically deposited metal is melted.

In testimony whereof I affix my signature.

HARRY R. WOLF.